United States Patent
Schmittle

[19]

[11] Patent Number: 5,941,478
[45] Date of Patent: Aug. 24, 1999

[54] STOL/VTOL FREE WING AIRCRAFT WITH MODULAR WING AND TAIL

[75] Inventor: Hugh Schmittle, Westminster, Md.

[73] Assignee: Freewing Aerial Robotics Corporation, College Station, Tex.

[21] Appl. No.: 09/066,980

[22] Filed: Apr. 28, 1998

[51] Int. Cl.⁶ ..................................................... B64C 3/38
[52] U.S. Cl. ........................... 244/48; 244/131; 244/120; 244/124
[58] Field of Search .............................. 244/48, 131, 120, 244/124, 7 R, 7 A, 7 B, 7 C, 39

[56] References Cited

U.S. PATENT DOCUMENTS

| | | | |
|---|---|---|---|
| 1,016,929 | 2/1912 | Black | 244/38 |
| 2,438,309 | 3/1948 | Zimmerman | 244/13 |
| 2,481,379 | 9/1949 | Zimmerman | 244/13 |
| 2,580,312 | 12/1951 | Moore | 244/7 C |
| 2,708,081 | 5/1955 | Dobson | 244/48 |
| 5,395,073 | 3/1995 | Rutan et al. | |

*Primary Examiner*—Charles T. Jordan
*Assistant Examiner*—Tien Dinh
*Attorney, Agent, or Firm*—Lowe Hauptman, Gopstein Gilman & Berner

[57] ABSTRACT

A mechanism for quickly removing and installing the free wings and/or the tail booms of a freewing aircraft to the fuselage. The fuselage includes a free wing cross tube extending transversely through the fuselage at the spanwise axis, and each of the left and right free wings includes a support tube disposed therein, also along the spanwise axis, with a portion of the wing structural tube being received within the fuselage cross tube. A quick-release pin is insertable in holes disposed in both the structural tube and the cross tube when the holes are placed in alignment. A second cross tube extends transversely through the rear end of the fuselage at the tail boom pivot axis. At least a portion of each tail boom member is disposed in surrounding relationship to the cross tube. In a preferred embodiment, a quick-release pin is insertable in holes disposed in both the tail boom member portion and the cross tube when the holes are placed in alignment.

24 Claims, 4 Drawing Sheets

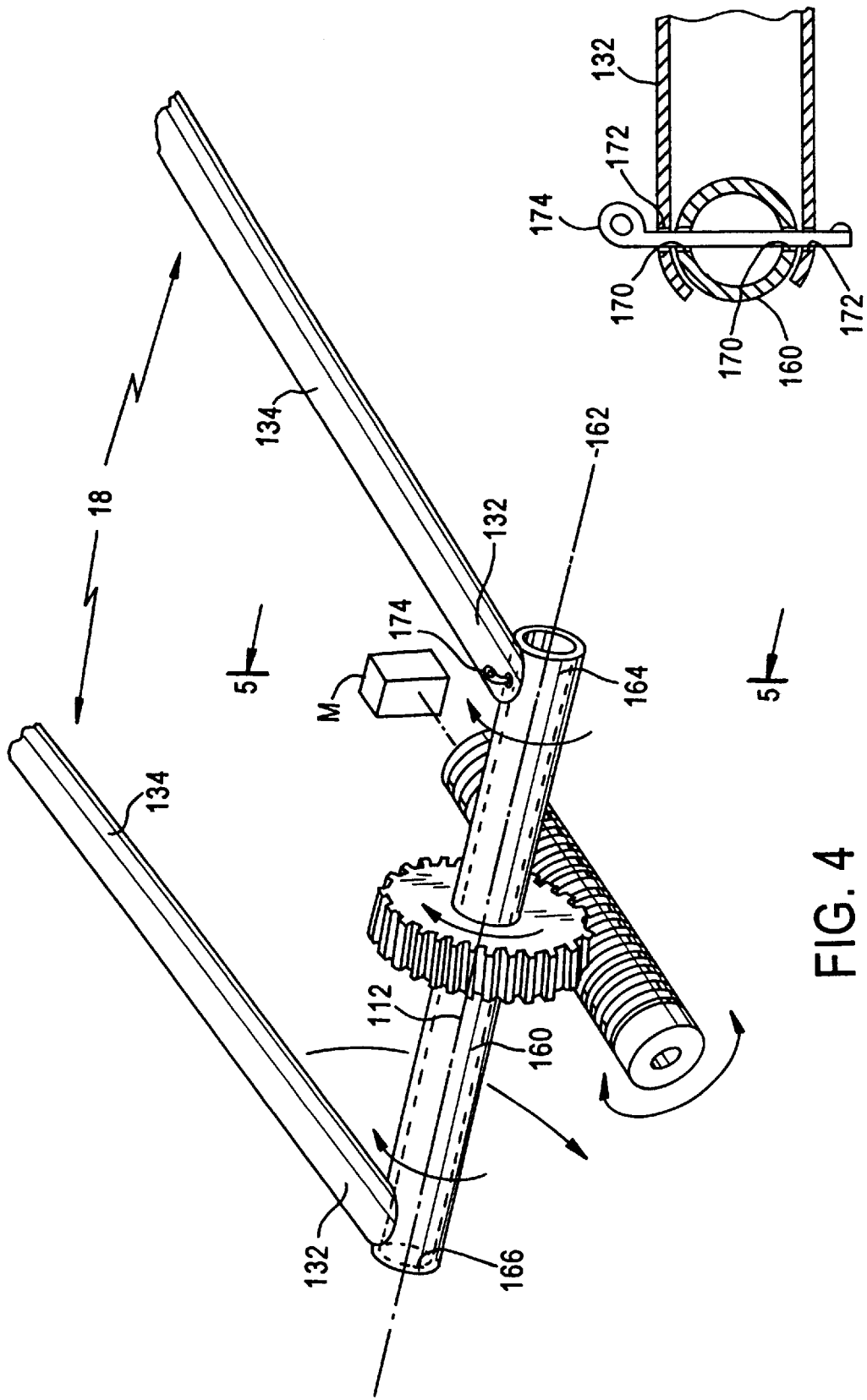

STOL/VTOL FREE WING AIRCRAFT WITH MODULAR WING AND TAIL

RELATED APPLICATIONS

The present application is a continuation-in-part of co-pending prior application Ser. No. 08/332,321, filed Oct. 31, 1994, which is a continuation of prior application Ser. No. 08/007,130, filed Jan. 22, 1993, entitled "STOL/VTOL Free Wing Aircraft With Articulated Tail Boom," now U.S. Pat. No. 5,395,073, which is a continuation-in-part of prior application Ser. No. 07/850,913, filed Mar. 13, 1992, entitled "Thrust Vectoring Free Wing Aircraft," now U.S. Pat. No. 5,340,057, which is a continuation-in-part of prior application Ser. No. 07/795,329, filed Nov. 21, 1991, now U.S. Pat. No. 5,280,863, the disclosures of which are incorporated by reference herein in their entirety.

TECHNICAL FIELD

The present invention relates generally to short field and vertical take-off and landing (STOL/VTOL) aircraft and, more particularly, to a STOL/VTOL aircraft including thrust vectoring means located either inside or outside of the propeller wash, the thrust vectoring means permitting transitioning between STOL or VTOL and straight and level flight.

BACKGROUND ART

The above-referenced patent applications disclose aircraft using a free wing configuration. As used in this present specification, a free wing or "freewing" is a wing attached to an aircraft fuselage in a manner such that the wing is freely pivotable about its spanwise axis. This arrangement enables the wing to have an angle of attack which is determined solely by aerodynamic forces acting on the wing. Rotation of the wing, without pilot intervention, induced by changes in the direction of relative wind over the wing surfaces, causes the angle of incidence between the wing and the aircraft fuselage to vary so that the wing presents a substantially constant angle of attack to the relative wind which, in horizontal flight, enables the aircraft to be essentially stall free.

The free wing is free to rotate or pivot about its spanwise axis. The free wing generally includes left and right wings extending from opposite sides of the fuselage; these wings are coupled together to collectively freely pivot about the spanwise axis. The left and right wings may be adjustable in pitch relative to one another as disclosed in the aforesaid applications, the relevant disclosures of which are incorporated by reference herein. The aircraft may further include rudders and elevators in the tail section which may be controlled in a conventional manner for yaw and pitch control, respectively. Further, it will be appreciated that other types of propulsion systems may be utilized, such as variable-pitch propellers, as disclosed in co-pending application serial no. To Be Assigned, entitled "STOL/VTOL Free wing Aircraft with Variable Pitch Propulsion Means", filed concurrently herewith, counter-rotating propellers and multi-engine arrangements attached to the fuselage.

Because one of the major advantages of a free wing aircraft is the intrinsic stability of the aircraft, the aircraft is particularly suitable for use as an unmanned aerial vehicle (UAV) where a highly stable platform is necessary and desirable. For example, UAV's are often used by the military as platforms for maintaining sensors trained on a target. Fixed wing UAV aircraft have a high sensitivity to turbulence, particularly at low altitudes, thus a stabilization system is required for onboard sensors to counter turbulence-induced platform motion. The high stability of a free wing aircraft eliminates or minimizes the stabilization problem in a UAV aircraft because the platform itself, i.e., the fuselage, is much more stable even in low-altitude, highly turbulent conditions.

One disadvantage of any aircraft, and particularly, prior art UAV aircraft, is that, in the event a component of the aircraft is damaged, the entire aircraft is downed until the component can be repaired.

Accordingly, it is an object of the present invention to provide an improved free wing aircraft minimizing the "down time" of the aircraft due to damage to one or more components.

Another object of the invention is to provide an aircraft an improved free wing aircraft permitting easy replacement of damaged components.

Yet another object of the invention is to provide an improved free wing aircraft including a means for quickly removing and installing components, particularly, wings and tail booms, to the fuselage.

SUMMARY OF THE INVENTION

These and other objects are achieved by a free wing aircraft including the modular wing and tail of the present invention.

A thrust vectoring free wing aircraft, according to the present invention, comprises a fuselage including a wing on each side thereof, means for connecting the wings to one another and to the fuselage for free pivotal movement relative to the fuselage about a spanwise axis for flight in a predetermined generally horizontal direction in a free wing mode of aircraft operation, and a propulsion system carried by the fuselage for developing thrust and propelling the aircraft both in the predetermined direction and in a near vertical flight orientation. Aerodynamic surfaces are carried by the fuselage for vectoring the thrust of the propulsion system away from the predetermined direction of flight sufficiently to achieve the near vertical flight orientation, thereby establishing an angle between the fuselage and the direction of flight. Also provided is means for quickly releasing and installing each of the free wings from the fuselage.

In accordance with one embodiment of the invention, the fuselage includes a cross tube extending transversely through the fuselage at the spanwise axis, and each wing includes a structural tube extending through at least a portion of the wing at the spanwise axis. In this embodiment, the releasing and installing means comprises a means for connecting each wing structural tube to the fuselage cross tube.

In accordance with a further aspect of this invention, a portion of the wing structural tube is received within the fuselage cross tube, and wherein the connecting means comprises a hole disposed in the wing structural tube, a hole disposed in the cross tube, and a quick-release pin insertable in both the holes when the holes are placed in alignment.

In accordance with another embodiment of this invention, an aircraft comprises a fuselage including a source of propulsion for propelling the aircraft in a horizontal flight and in a short field take-off and landing (STOL) flight mode. A free wing is connected to the fuselage for free pivotal movement relative thereto about a spanwise axis. The free wing includes left and right free wings extending from the fuselage and being freely rotatable relative thereto. A tail boom is connected to the fuselage. The tail boom is formed with horizontal tail surfaces and vertical tail surfaces to provide for directional stability and yaw control. A mechanism is provided for pivoting the fuselage relative to the tail boom independently from pivoting of the freewing about the spanwise axis, about an axis of pivot extending parallel to or coincident with the spanwise axis. Also provided is means for quickly releasing and installing at least one of the left and right free wings and the tail boom from the fuselage.

In accordance with another embodiment of the invention, the aircraft further comprises a free wing cross tube extending transversely through the fuselage at the spanwise axis and a support tube disposed in each of the left and right free wing along the spanwise axis, in which case the releasing and installing means comprises a means for connecting each wing support tube to the fuselage cross tube.

In accordance with a further aspect of this invention, the diameter of the wing structural tube is greater than the diameters of the wing structural tubes, and a portion of the wing structural tube is received within the fuselage cross tube. The connecting means comprises a hole disposed in the wing structural tube, a hole disposed in the cross tube, and a quick-release pin insertable in both the holes when the holes are placed in alignment.

In accordance with another embodiment of this invention, the connecting means comprises a first pair of aligned holes disposed in the wing structural tube, a first pair of aligned holes disposed in the cross tube, and a quick-release pin insertable in both first pairs of holes when the first pairs of holes are placed in alignment.

In accordance with yet another embodiment of this invention, the connecting means further comprises a second pair of aligned holes disposed in the wing structural tube and offset from the first pair of wing structural tube aligned holes, a second pair of aligned holes disposed in the cross tube and offset from the first pair of cross tube aligned holes, and a second quick-release pin insertable in both second pairs of holes when the second pairs of holes are placed in alignment.

In accordance with another aspect of this invention, the first pair of wing structural tube aligned holes are offset from the second pair of wing structural tube aligned holes by 90°, and wherein the first pair of cross tube aligned holes are offset from the second pair of cross tube aligned holes by 90°.

In accordance with another aspect of this invention, the connecting means comprises a threaded hole disposed in wing structural tube, a hole disposed in the cross tube, and a threaded screw received in both the cross tube hole and the wing structural tube threaded hole.

In accordance with a further embodiment of this invention, the connecting means comprises a first hole disposed in the wing structural tube, a first hole disposed in the cross tube, a threaded screw insertable in both the holes when the holes are placed in alignment, and a nut received on the end of the threaded screw.

In accordance with another embodiment of this invention, the tail boom includes a second cross tube extending transversely through the fuselage and is rotatable about its longitudinal axis via bearings mounted in the fuselage, and a pair of tail boom members respectively attached to opposite ends of the cross tube to project rearwardly therefrom. The tail surfaces are formed at distal ends of the tail boom members.

In accordance with yet a further aspect of this invention, the tail boom cross tube extends transversely through a rear portion of the fuselage in rearwardly spaced relation to the free wing axis of rotation.

A portion of each tail boom member is disposed in surrounding relationship to the cross tube, and the means for quickly releasing and installing the tail boom comprises a hole disposed in the tail boom member portion, a hole disposed in the cross tube, and a quick-release pin insertable in both the holes when the holes are placed in alignment.

In accordance with another embodiment of this invention, an aircraft comprises a fuselage including a source of propulsion for propelling the aircraft in a horizontal flight and in a short field take-off and landing (STOL) flight mode. A free wing is connected to the fuselage for free pivotal movement relative thereto about a spanwise axis. The free wing includes left and right free wings extending from the fuselage and being freely rotatable relative thereto. A tail boom is connected to the fuselage. The tail boom is formed with horizontal tail surfaces and vertical tail surfaces to provide for directional stability and yaw control. A mechanism is provided to pivot the fuselage relative to the tail boom independently from pivoting of the freewing about the spanwise axis, about an axis of pivot extending parallel to or coincident with the spanwise axis. Also provided is a first means for quickly releasing and installing the left and right free wings from the fuselage, and a second means for quickly releasing and installing the tail boom from the fuselage.

In accordance with another aspect of the invention, a free wing cross tube extends transversely through the fuselage at the spanwise axis. A support tube is disposed in each of the left and right free wing along the spanwise axis. A portion of the wing structural tube is received within the fuselage cross tube. The tail boom includes a second cross tube extending transversely through the fuselage and is rotatable about its longitudinal axis via bearings mounted in the fuselage. A pair of tail boom members respectively is attached to opposite ends of the cross tube to project rearwardly therefrom. The tail surfaces are formed at distal ends of the tail boom members. At least a portion of each tail boom member is disposed in surrounding relationship to the cross tube. The first connecting means comprises a hole disposed in the wing structural tube, a hole disposed in the cross tube, and a quick-release pin insertable in both the holes when the holes are placed in alignment. The second means for quickly releasing and installing the tail boom comprises a hole disposed in the tail boom member portion, a hole disposed in the cross tube, and a quick-release pin insertable in both the holes when the holes are placed in alignment.

BRIEF DESCRIPTION OF THE DRAWINGS

FIG. 4 is a perspective view, partly in schematic form, of a mechanism for pivoting the tail boom assembly relative to the fuselage and a means for quickly releasing and installing the tail booms to the fuselage, for the aircraft of FIG. 1, with the fuselage, fixed wing center sections and free wings omitted for ease of illustration.

FIG. 5 is a sectional view, enlarged for clarity, taken along lines 5—5 of FIG. 4, of the quickly releasing and installing means of FIG. 2.

DETAILED DESCRIPTION OF THE PREFERRED EMBODIMENT

Figure 1:
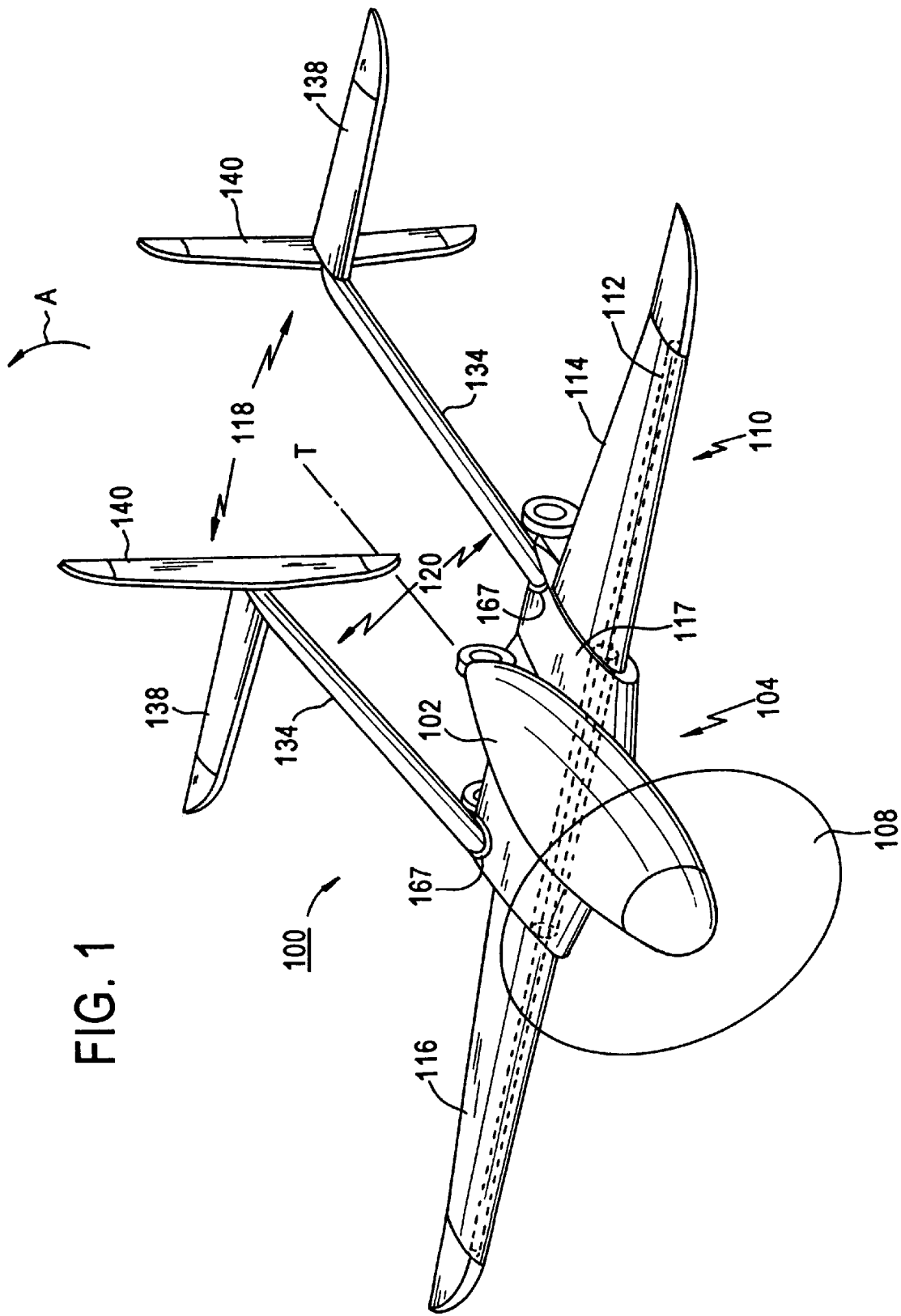
FIG. 1 is a perspective view of the STOL free wing aircraft of the present invention.

As illustrated in FIG. 1, a free wing aircraft 100, as disclosed in the 5,395,073 patent, incorporated herein by reference, is capable of short field take-offs and landings (STOL) and straight and level flight, and, with some minor modifications, vertical take-offs and landings (VTOL) as well. The free wing aircraft 100 comprises a fuselage 102 containing a propulsion system 104 including an engine (not shown) at the forward end of the fuselage rotating a propeller 108. A free wing 110 is connected to the fuselage 102 and is free to rotate or pivot about its spanwise axis 112 located forward of its aerodynamic center. The free wing 110 includes left and right wings 114 and 116 extending from a fixed wing root or center section 117 formed on opposite sides of the fuselage 102 and which left and right wings are coupled together in a unique manner, disclosed in the '073 patent, to collectively freely pivot about the spanwise axis 112. The left and right wings 114, 116 may be adjustable in pitch relative to one another in the manner described in the aforesaid '057 patent, or may be formed with elevons (not shown) to provide for elevator and aileron control.

The aircraft 100 further comprises a tail section 118 which is mounted to a boom assembly 120 pivotally connected or articulated to the fuselage 102 for movement relative to the fuselage both into and out of alignment with the thrust line T of the propulsion system 104 to enable STOL/VTOL operations as well as straight and level flight, as described in the aforesaid '073 application. Preferably, boom assembly 120 includes a pair of parallel booms 134, each including at the rear end thereof a horizontal stabilizing member 138 and a vertical stabilizing member 140.

Figure 2:
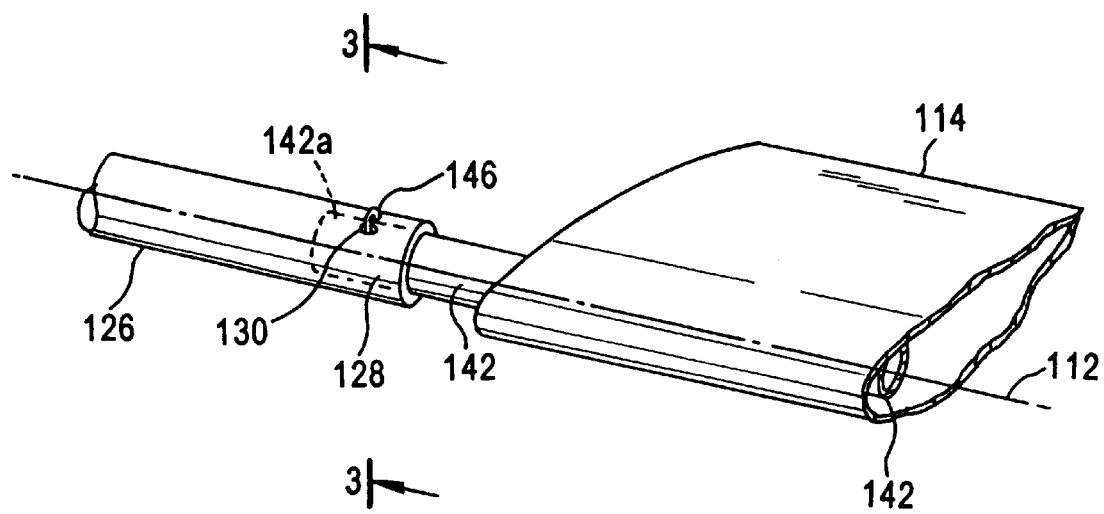
FIG. 2 is a perspective view of a means for quickly releasing and installing the wings to the fuselage, for the aircraft of FIG. 1, with the fuselage and fixed wing center sections omitted for clarity.
Figure 3:
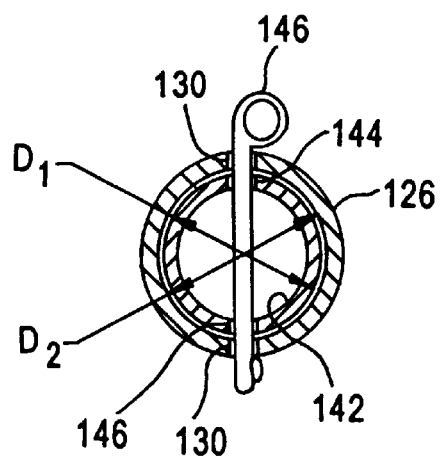
FIG. 3 is a sectional view, enlarged for clarity, taken along lines 3—3 of FIG. 2, of the quickly releasing and installing means of FIG. 2.

An exemplary mechanism for quickly releasing and installing wings 114, 116 to fuselage 102 is best depicted in FIGS. 2 and 3. Although the mechanism is described with reference to the STOL aircraft of FIG. 1 disclosed in the '073 patent, this mechanism is equally applicable to the VTOL aircraft disclosed in the '057 patent to replace damaged wings. A cross tube 126 is provided in the forward portion of the fuselage (not shown). Cross tube 126 extends through both the fuselage and the fixed wing center section 117 of the second embodiment, and the outer ends 128 of cross tube 126 may terminate outwardly beyond the leading outer side edges of the fixed wing center portion 117. Each of left and right wings 114, 116 are supported by a wing structural tube 142 which defines spanwise axis 112. As best seen in FIG. 3, the outer diameter $D_1$ of structural tube 142 is smaller than the inner diameter $D_2$ of cross tube 126 such that a portion 142a of structural tube 142 can be received within, and thus extends coaxially with, cross tube 126.

One embodiment of a mechanism for quickly releasing and installing wings 114, 116 is depicted in FIG. 3. Disposed in cross tube 126 is a pair of aligned holes 130. Likewise, structural tube 142 includes a pair of aligned holes 144 disposed therein. Structural tube 142 can be rotated such that holes 130 are in alignment with holes 144. When holes 130 are in alignment with holes 144, a quick release pin, such as pip pin 146, can be inserted through both pairs of aligned holes 126 and 144.

It will now be apparent to one skilled in the art that installation of wing 114, 116 is accomplished by inserting support tube 142 within cross tube 126 such that portion 142a is received within outer end 128 of cross tube 126. Once support tube 142 is inserted into cross tube 126, support tube 142 is rotated until holes 130 and 144 are in alignment, whereupon pin 146 is inserted. To remove wing 114, 116, pin 146 is removed and support tube 142 is slid out of cross tube 126.

A mechanism for quickly removing and installing tail boom 134 from the aircraft and an exemplary mechanism for pivoting the articulated tail boom assembly 120 relative to the fuselage 102 are shown in FIG. 4. A second cross tube 160 is provided, preferably in the rear portion of fuselage 102 and extending through the fuselage and fixed wing center portion 117 along a tail boom pivot axis 162. Alternatively, if it is desired that the tail booms pivot about the wing spanwise axis, cross tube 160 may be omitted, whereupon cross tube 126 will be used.

The opposite ends 164, 166 of second cross tube 160 may terminate at, or preferably be flush with, the leading outer side edges of the fixed wing center portion 117. Preferably, a recess 167 is provided in fixed wing center portion 117 to permit access to second cross tube 160. Alternately, opposite ends 164, 166 of second cross tube 160 may project outwardly from fixed wing center portion 117, whereupon each parallel tail boom 134 is disposed on the outer surface of fixed wing center portion 117 and recess 167 is not required. Each of the parallel tail booms 134 includes a forward end 132 disposed at least partially in surrounding relationship, as shown in FIG. 5, about second cross tube 160. Disposed in either end of cross tube 160 is a pair of coaxial holes 170. Likewise, forward end 132 of each tail boom 134 includes a pair of coaxial holes 172 disposed therein. When coaxial holes 170 are in alignment with coaxial holes 172, a quick release pin, such as pip pin 174, can be inserted through both pairs of coaxial holes 170 and 172. It will now be apparent to one skilled in the art that installation of boom 134 is accomplished by inserting forward end 132 of boom 134 about cross tube 160 such that coaxial holes 170 and 172 are in alignment, whereupon pin 174 is inserted. To remove tail boom 134, pin 174 is removed and boom 134 is withdrawn from cross tube 160.

Figure 6:
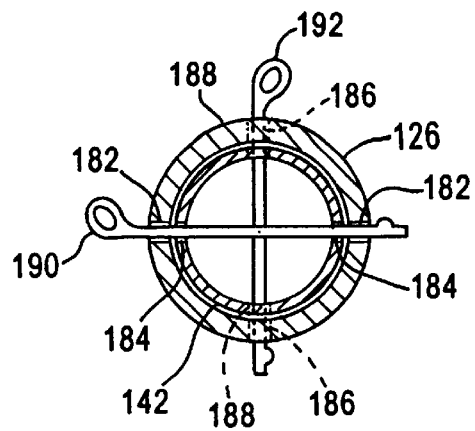
FIG. 6 is a sectional view, enlarged for clarity, taken along lines 3—3 of FIG. 2, of another embodiment of the quickly releasing and installing means.
Figure 7:
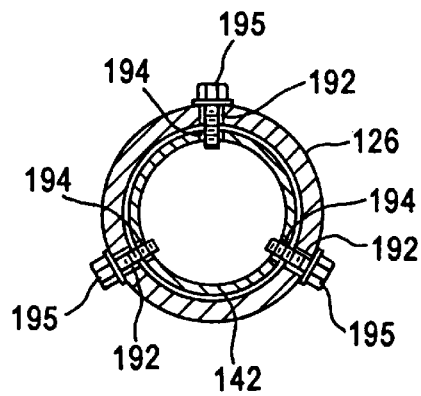
FIG. 7 is a sectional view, enlarged for clarity, taken along lines 3—3 of FIG. 2, of another embodiment of the quickly releasing and installing means.
Figure 8:
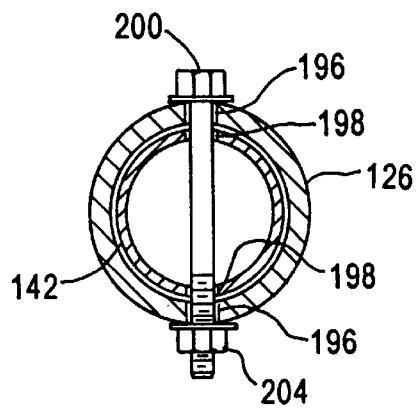
FIG. 8 is a sectional view, enlarged for clarity, taken along lines 3—3 of FIG. 2, of another embodiment of the quickly releasing and installing means.

Alternate embodiments of the mechanism for quickly releasing and installing the wings are shown in FIGS. 6–8. While these embodiments are shown relative to the wing, it is to be understood that these embodiments are equally applicable to the mechanism for quickly releasing and installing the tail boom, with minor modification as will be apparent to one skilled in the art.

In FIG. 6, a first pair of coaxial holes 182 are disposed in cross tube 126. Likewise, structural tube 142 includes a first pair of coaxial holes 184 which can be placed in alignment with coaxial holes 182 be rotating structural tube 142 relative to cross tube 126. A second pair of coaxial holes 186 are disposed in cross tube 126 offset from first pair of coaxial holes 182 by, for instance, 90°. Structural tube 142 includes a second pair of coaxial holes 188, again offset from first pair of coaxial holes 184 by, for instance, 90°. When structural tube 142 is rotated relative to cross tube 126 such that coaxial holes 182 and 184 are in alignment, coaxial holes 186 and 188 are also aligned. A first quick release pin 190 is included disposed in coaxial holes 182, 184, while a second quick release pin 192 is included, disposed in coaxial holes 186, 188. It thus can be appreciated by one skilled in the art that this embodiment provides a back-up for the single quick-release pin of FIG. 3.

In another embodiment of the quick release mechanism, as shown in FIG. 7, cross tube 126 includes a plurality of holes 192 circumferentially spaced about cross tube 126. Structural tube 142 includes a plurality of threaded holes 194, also spaced circumferentially about structural tube 142, which can be aligned with holes 192 by rotating structural tube 142 relative to cross tube 126. When the holes 192 and 194 are so aligned, a plurality of threaded screws 195 are inserted into threaded holes 194.

A similar embodiment is shown in FIG. 8. As shown, cross tube 126 includes a pair of coaxial holes 196, and structural tube 142 includes a pair of coaxial holes 198. The holes 196 and 198 can be placed in alignment by rotating structural tube 142 relative to cross tube 126. When coaxial holes 130 are in alignment with coaxial holes 144, a threaded bolt 200 can be inserted through both pairs of coaxial holes 126 and 144 and secured with a nut 202. Preferably, nut 202 is self locking, as well known, or alternatively, a locking-type washer may be provided.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A thrust vectoring free wing aircraft comprising:
   a fuselage;
   a wing on each side of the fuselage;
   means for connecting the wings to one another and to the fuselage for free pivotal movement relative to the fuselage about a spanwise axis for flight in a predetermined generally horizontal direction in a free wing mode of aircraft operation;
   a propulsion system carried by the fuselage for developing thrust and propelling the aircraft both in the predetermined direction and in a near vertical flight orientation;
   aerodynamic surfaces carried by the fuselage for vectoring the thrust of the propulsion system away from the predetermined direction of flight sufficiently to achieve the near vertical flight orientation, thereby establishing an angle between the fuselage and the direction of flight; and
   means for quickly releasing and installing each of the free wings from the fuselage.

2. The aircraft of claim 1, wherein the fuselage includes a cross tube extending transversely through the fuselage at the spanwise axis, and wherein each wing includes a structural tube extending through at least a portion of the wing at the spanwise axis, wherein the releasing and installing means comprises a means for connecting each wing structural tube to the fuselage cross tube.

3. The aircraft of claim 2, wherein a portion of the wing structural tube is received within the fuselage cross tube, and wherein the connecting means comprises a first hole disposed in the wing structural tube, a first hole disposed in the cross tube, and a quick-release pin insertable in both the holes when the holes are placed in alignment.

4. The aircraft of claim 3, wherein the connecting means further comprises a second hole coaxially disposed in the wing structural tube in alignment with the wing structural tube first hole, and a second hole coaxially disposed in the cross tube in alignment with the cross tube first hole, wherein the quick-release pin is insertable in both the first and second wing structural tube holes and the first and second cross tube holes.

5. The aircraft of claim 2, wherein a portion of the wing structural tube is received within the fuselage cross tube, and wherein the connecting means comprises a first pair of coaxially aligned holes disposed in the wing structural tube, a first pair of coaxially aligned holes disposed in the cross tube, and a quick-release pin insertable in both first pairs of holes when the first pairs of holes are placed in alignment.

6. The aircraft of claim 5, wherein the connecting means further comprises a second pair of coaxially aligned holes disposed in the wing structural tube and offset from the first pair of wing structural tube aligned holes, a second pair of coaxially aligned holes disposed in the cross tube and offset from the first pair of cross tube aligned holes, and a second quick-release pin insertable in both second pairs of holes when the second pairs of holes are placed in alignment.

7. The aircraft of claim 6, wherein the first pair of wing structural tube aligned holes are offset from the second pair of wing structural tube aligned holes by 90°, and wherein the first pair of cross tube aligned holes are offset from the second pair of cross tube aligned holes by 90°.

8. The aircraft of claim 2, wherein a portion of the wing structural tube is received within the fuselage cross tube, and wherein the connecting means comprises a threaded hole disposed in wing structural tube, a hole disposed in the cross tube, and a threaded screw received in both the cross tube hole and the wing structural tube threaded hole.

9. The aircraft of claim 2, wherein a portion of the wing structural tube is received within the fuselage cross tube, and wherein the connecting means comprises a first pair of coaxial holes disposed in the wing structural tube, a first pair of coaxial holes disposed in the cross tube, a threaded screw insertable in both pairs of holes when the holes are placed in alignment, and a nut received on the end of the threaded screw.

10. An aircraft, comprising:
    a fuselage including a source of propulsion for propelling the aircraft in a horizontal flight and in a short field take-off and landing (STOL) flight mode;
    a free wing connected to the fuselage for free pivotal movement relative thereto about a spanwise axis, the free wing including left and right free wings extending from the fuselage and being freely rotatable relative thereto;
    a tail boom connected to the fuselage, the tail boom being formed with horizontal tail surfaces and vertical tail surfaces to provide for directional stability and yaw control; and
    a mechanism pivoting the fuselage relative to the tail boom independently from pivoting of the freewing about the spanwise axis, about an axis of pivot extending parallel to or coincident with the spanwise axis; and
    means for quickly releasing and installing at least one of the free wings and the tail boom from the fuselage.

11. The aircraft of claim 10, further comprising a free wing cross tube extending transversely through the fuselage at the spanwise axis and a support tube disposed in each of the left and right free wing along the spanwise axis, wherein the releasing and installing means comprises a means for connecting each wing support tube to the fuselage cross tube.

12. The aircraft of claim 11, wherein a portion of the wing structural tube is received within the fuselage cross tube, and wherein the connecting means comprises a hole disposed in the wing structural tube, a hole disposed in the cross tube, and a quick-release pin insertable in both the holes when the holes are placed in alignment.

13. The aircraft of claim 10, wherein the tail boom includes a second cross tube extending transversely through the fuselage and is rotatable about its longitudinal axis via bearings mounted in the fuselage, and a pair of tail boom members respectively attached to opposite ends of the cross tube to project rearwardly therefrom, the tail surfaces being formed at distal ends of the tail boom members.

14. The aircraft of claim 13, wherein the tail boom cross tube extends transversely through a rear portion of the fuselage in rearwardly spaced relation to the free wing axis of rotation.

15. The aircraft of claim 13, wherein at least a portion of each tail boom member is disposed in surrounding relationship to the cross tube, wherein the means for quickly releasing and installing the tail boom comprises a first hole disposed in the tail boom member portion, a first hole disposed in the cross tube, and a quick-release pin insertable in both the holes when the holes are placed in alignment.

16. The aircraft of claim 15, wherein the connecting means further comprises a second hole disposed in the tail boom member portion in coaxial alignment with the tail boom member portion first hole, and a second hole disposed in the cross tube in coaxial alignment with the cross tube first hole, wherein the quick-release pin is insertable in both the first and second tail boom member portion holes and the first and second cross tube holes.

17. The aircraft of claim 13, wherein a portion of each tail boom member is disposed in surrounding relationship to the cross tube, and wherein the means for quickly releasing and installing the tail boom comprises a first pair of coaxially aligned holes disposed in the tail boom member portion, a first pair of coaxially aligned holes disposed in the cross tube, and a quick-release pin insertable in both first pairs of holes when the first pairs of holes are placed in alignment.

18. The aircraft of claim 17, wherein the quickly releasing and installing means further comprises a second pair of coaxially aligned holes disposed in the tail boom member portion and offset from the first pair of coaxially aligned holes, a second pair of coaxially aligned holes disposed in the cross tube and offset from the first pair of cross tube coaxially aligned holes, and a second quick-release pin insertable in both second pairs of holes when the second pairs of holes are placed in alignment.

19. The aircraft of claim 13, wherein a portion of each tail boom member is disposed in surrounding relationship to the cross tube, and wherein the means for quickly releasing and installing the tail boom comprises a threaded hole disposed in the cross tube, a hole disposed in the tail boom member portion, and a threaded screw received in both the tail boom member portion hole and the cross tube threaded hole.

20. The aircraft of claim 13, wherein a portion of each tail boom member is disposed in surrounding relationship to the cross tube, and wherein the means for quickly releasing and installing the tail boom comprises a pair of holes disposed in the tail boom member portion, a pair of holes disposed in the cross tube, a threaded screw insertable in both pairs of holes when the holes are placed in alignment, and a nut received on the end of the threaded screw.

21. An aircraft, comprising:
a fuselage including a source of propulsion for propelling the aircraft in a horizontal flight and in a short field take-off and landing (STOL) flight mode;
a free wing connected to the fuselage for free pivotal movement relative thereto about a spanwise axis, the free wing including left and right free wings extending from the fuselage and being freely rotatable relative thereto;
a tail boom connected to the fuselage, the tail boom being formed with horizontal tail surfaces and vertical tail surfaces to provide for directional stability and yaw control; and
a mechanism pivoting the fuselage relative to the tail boom independently from pivoting of the freewing about the spanwise axis, about an axis of pivot extending parallel to or coincident with the spanwise axis;
first means for quickly releasing and installing the left and right free wings from the fuselage; and
and second means for quickly releasing and installing the tail boom from the fuselage.

22. The aircraft of claim 21, further comprising:
a free wing cross tube extending transversely through the fuselage at the spanwise axis and a support tube disposed in each of the left and right free wing along the spanwise axis, wherein a portion of the wing structural tube is received within the fuselage cross tube;
wherein the tail boom includes a second cross tube extending transversely through the fuselage and is rotatable about its longitudinal axis via bearings mounted in the fuselage, and a pair of tail boom members respectively attached to opposite ends of the cross tube to project rearwardly therefrom, the tail surfaces being formed at distal ends of the tail boom members, at least a portion of each tail boom member being disposed in surrounding relationship to the cross tube;
wherein the first connecting means comprises a hole disposed in the wing structural tube, a hole disposed in the cross tube, and a quick-release pin insertable in both the holes when the holes are placed in alignment; and
wherein the second means for quickly releasing and installing the tail boom comprises a hole disposed in the tail boom member portion, a hole disposed in the cross tube, and a quick-release pin insertable in both the holes when the holes are placed in alignment.

23. An aircraft, comprising:
a fuselage including a source of propulsion for propelling the aircraft in a horizontal flight and in a short field take-off and landing (STOL) flight mode,
a free wing connected to the fuselage for free pivotal movement relative thereto about a spanwise axis, the free wing including left and right free wings extending from the fuselage and being freely rotatable relative thereto, the left and right free wings each including a support tube disposed therein along the spanwise axis and including a hole disposed therein, the fuselage including a free wing cross tube extending transversely through the fuselage at the spanwise axis and including a hole disposed therein, a portion of the wing structural tube being received within the fuselage cross tube;
a quick-release pin insertable in both the holes when the holes are placed in alignment;

a tail boom connected to the fuselage, the tail boom being formed with horizontal tail surfaces and vertical tail surfaces to provide for directional stability and yaw control; and a mechanism pivoting the fuselage relative to the tail boom independently from pivoting of the freewing about the spanwise axis, about an axis of pivot extending parallel to or coincident with the spanwise axis.

24. An aircraft, comprising:

a fuselage including a source of propulsion for propelling the aircraft in a horizontal flight and in a short field take-off and landing (STOL) flight mode;

a free wing connected to the fuselage for free pivotal movement relative thereto about a spanwise axis, the free wing including left and right free wings extending from the fuselage and being freely rotatable relative thereto;

a tail boom connected to the fuselage, the tail boom being formed with horizontal tail surfaces and vertical tail surfaces to provide for directional stability and yaw control, the tail boom including a second cross tube extending transversely through the fuselage and rotatable about its longitudinal axis via bearings mounted in the fuselage, the tail boom including a hole, and a pair of tail boom members respectively attached to opposite ends of the cross tube to project rearwardly therefrom, the tail surfaces being formed at distal ends of the tail boom members, at least a portion of each tail boom member including a hole therein and being disposed in surrounding relationship to the cross tube;

a quick-release pin insertable in both the holes when the holes are placed in alignment; and a mechanism pivoting the fuselage relative to the tail boom independently from pivoting of the freewing about the spanwise axis, about an axis of pivot extending parallel to or coincident with the spanwise axis.

* * * * *